J. MORTON & J. P. SPAULDING.

Assignors by mesne assignments, to FARMERS FRIEND MANUFACTURING CO.

Seed Dropper.

No. 9,662. Reissued April 12, 1881.

Attest

Jas. L. Jones

Eugene L. Pinkous

Inventors

James Morton & J. P. Spaulding by Woods & Boyd their Attorneys.

THE NORRIS PETERS CO., WASHINGTON, D. C.

UNITED STATES PATENT OFFICE.

JAMES MORTON, OF CEDAR RAPIDS, AND JOHN P. SPAULDING, OF PERRY, IOWA, ASSIGNORS, BY MESNE ASSIGNMENTS, TO FARMERS FRIEND MANUFACTURING COMPANY, OF DAYTON, OHIO.

SEED-DROPPER.

SPECIFICATION forming part of Reissued Letters Patent No. 9,662, dated April 12, 1881.

Original No. 125,476, dated April 9, 1872; antedated March 23, 1872. Application for reissue filed December 14, 1880.

*To all whom it may concern:*

Be it known that we, JAMES MORTON, a citizen of the United States, now residing at Cedar Rapids, in the county of Linn and State of Iowa, and JOHN P. SPAULDING, a citizen of the United States, now residing at Perry, in the county of Dallas and State aforesaid, but both formerly of Des Moines, in the county of Polk, in said State, have invented certain new and useful Improvements in Rotary Seed-Droppers for Corn-Planters; and we do hereby declare that the following is a full, clear, and exact description of the construction and operation of the same, reference being had to the annexed drawings, making a part of this specification, and to the letters and figures of reference marked thereon.

Figure 1:
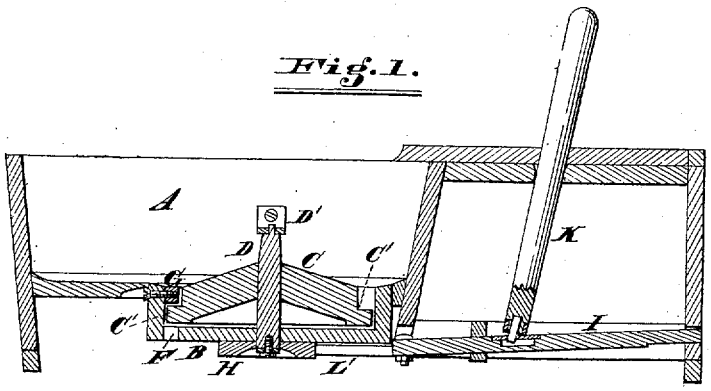
Figure 2:
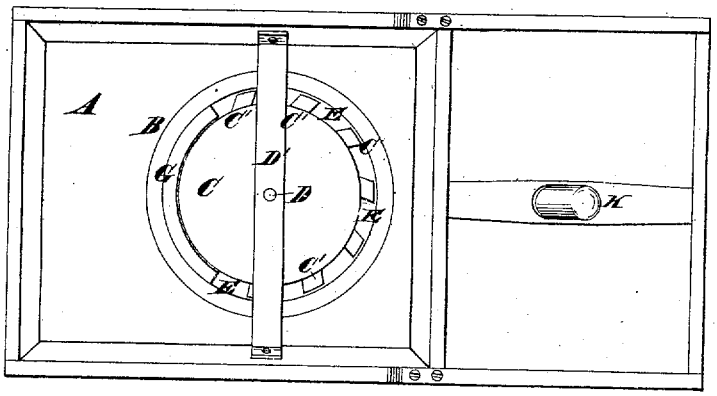
Figure 3:
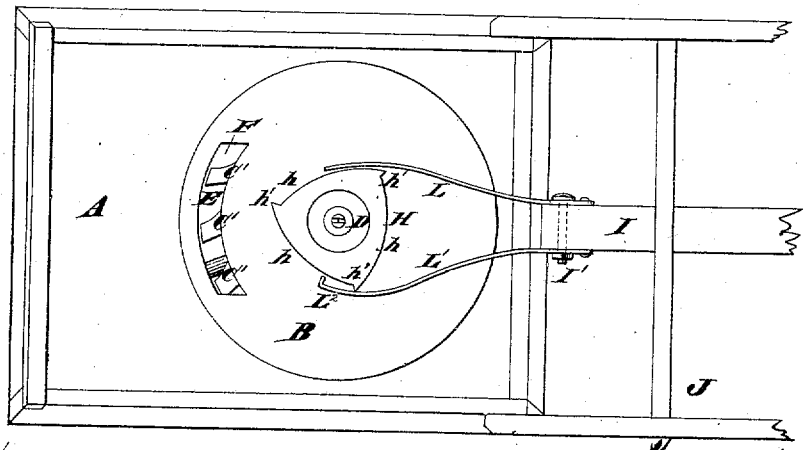

Figure 1 of the drawings is a representation of a vertical longitudinal section of our invention. Fig. 2 is a plan view of the top, and Fig. 3 is a plan view of the under side, of our invention.

This invention has relation to corn-planters; and the novelty consists in the construction and arrangement of the corn-dropping devices, whereby an exact number of grains may be deposited in each hill.

In corn-planters of this class, as heretofore constructed, the reciprocating slide has been arranged to operate either on projections from the periphery or from the lower side of the dropping disk or wheel.

Our invention consists, first, in the use of an intermediate armed wheel, located beneath the dropping-disk and adapted to receive motion from the slide by direct contact of the slide with its arms, substantially as described, and for the purpose specified, and connected with the dropping-disk, so that it and the dropping-disk will rotate together in the same direction, and so that it may be removed and replaced while the disk is retained; second, in an armed wheel adapted to receive motion from a reciprocating slide, with a dropping-disk attached to and above the armed wheel, and a fixed bottom plate located between the armed wheel and dropping-disk; third, in a fixed bottom plate, located between the armed wheel, which receives motion from the slide, and the dropping-disk, and adapted to act as a bearing for the shaft of the said armed wheel; fourth, in an armed wheel adapted to receive motion from the slide, and provided with a central shaft, which projects upwardly through a fixed bottom plate, so that the dropping-disk may be carried upon it above said fixed plate.

The invention further consists in a spring cut-off, which is so constructed and arranged as to permit it to yield in a plane parallel with the upper face of the dropping disk or wheel.

In the accompanying drawings, illustrating this invention, A represents a hopper having a sunken chamber with a fixed bottom-plate, B, of a circular form. C represents a circular disk, designed to rotate in said chamber, and therefore secured to or furnished with a spindle, D, journaled at its lower end to the bottom of chamber B and at its upper end to a transverse bar, D′.

The disk C is constructed with a flange, C′, projecting from its periphery and fitting the interior of the chamber, a space being left between it and the top of said disk to hold the grain.

E designates notches cut in the flange C′, of a size and shape to hold a single grain of corn standing on edge.

F is a curved slot cut through the bottom of the chamber B, and of a length equal to the extent of space occupied by three or other definite number of the notches E. The disk rotates with an intermittent motion, and as the notches in sets attain their positions above the slots F, they let fall their contents into each hill.

G represents an inclined spring cut-off, curved to fit the space above the notches E, and secured therein above the slot F, so as to permit it to yield in a plane parallel with the upper face of the flange of the dropping-disk. One end of said spring rests on the flange C′, and serves to throw back the superfluous quantities of grain which are carried toward the slot F.

H denotes the armed wheel, secured to the lower end of the spindle D. It is constructed with three curved sides, *h*, terminating each in a projection or arm, *h′*.

I represents a slide, arranged to play through slots in the frame J, and furnished with an upright lever, K, to work it. To one end of said slide is attached a pair of adjustable spring-jaws, L L′, of which L′ is formed with a hold, $L^2$. Said jaws diverge so as to embrace the wheel H.

When the slide is vibrated the jaws move forward, one sliding over one of the curved sides of the wheel, and the other pressing against one of the projections or arms $h'$, and thrusting the wheel around toward the first, which finally engages the approaching projection or arm, and, by a reverse motion of the slide, forces it back, and continues the rotation of the wheel, and gives an intermittent rotary motion in one direction of the disk C.

The jaws are made adjustable by being slotted and secured to the slide I by a transverse bolt, I′.

The size of the wheel H is to be changed to suit the number of grains desired to be deposited in each hill.

What we claim as new, and desire to secure by Letters Patent, is—

1. In a corn-planter dropping mechanism, the combination of an armed wheel, a reciprocating slide adapted to actuate said wheel by its action upon and in contact with its arms, and a dropping-disk removably attached to and above the wheel, and adapted to rotate with it, as and for the purpose specified.

2. In corn-planter dropping mechanism, the combination of an armed wheel adapted to be actuated by the reciprocating slide, and having the dropping-disk attached to and above it, and so as to be rotated with it, and a fixed bottom plate located between said wheel and dropping-disk, substantially as and for the purpose specified.

3. The fixed bottom plate, B, located between the armed wheel H and dropping-disk C, and adapted to act as a bearing for the shaft D, arranged substantially as described, and for the purpose specified.

4. In combination with a reciprocating slide, I, and dropping-disk C, the wheel H, rotated by the action of the slide on and in contact with its arms, and having a shaft, D, projecting upward, and the dropping-disk C fixed upon its upper end, substantially as and for the purpose specified.

5. The cut-off G, adapted to yield in a plane parallel with the upper face of the dropping-disk C, and in combination with the dropping-disk C, substantially as and for the purpose specified.

6. The wheel H, attached beneath the notched dropping-disk C, in combination with the double-acting spring-jaws L L′ and slide I, substantially as and for the purpose set forth.

In testimony whereof we have hereunto set our hands, in the presence of two subscribing witnesses, this 3d day of December, 1880.

JAMES MORTON.
JOHN P. SPAULDING.

Witnesses as to signature of Morton:
ANDREW RUNSTETLER,
A. V. EASTMAN.

Witnesses as to signature of John P. Spaulding:
HENRY ANDERSON HOYT,
GEORGE COOPER.